March 1, 1932.  A. H. MORRIS  1,847,972
BATTERY CONNECTER
Filed July 17, 1930
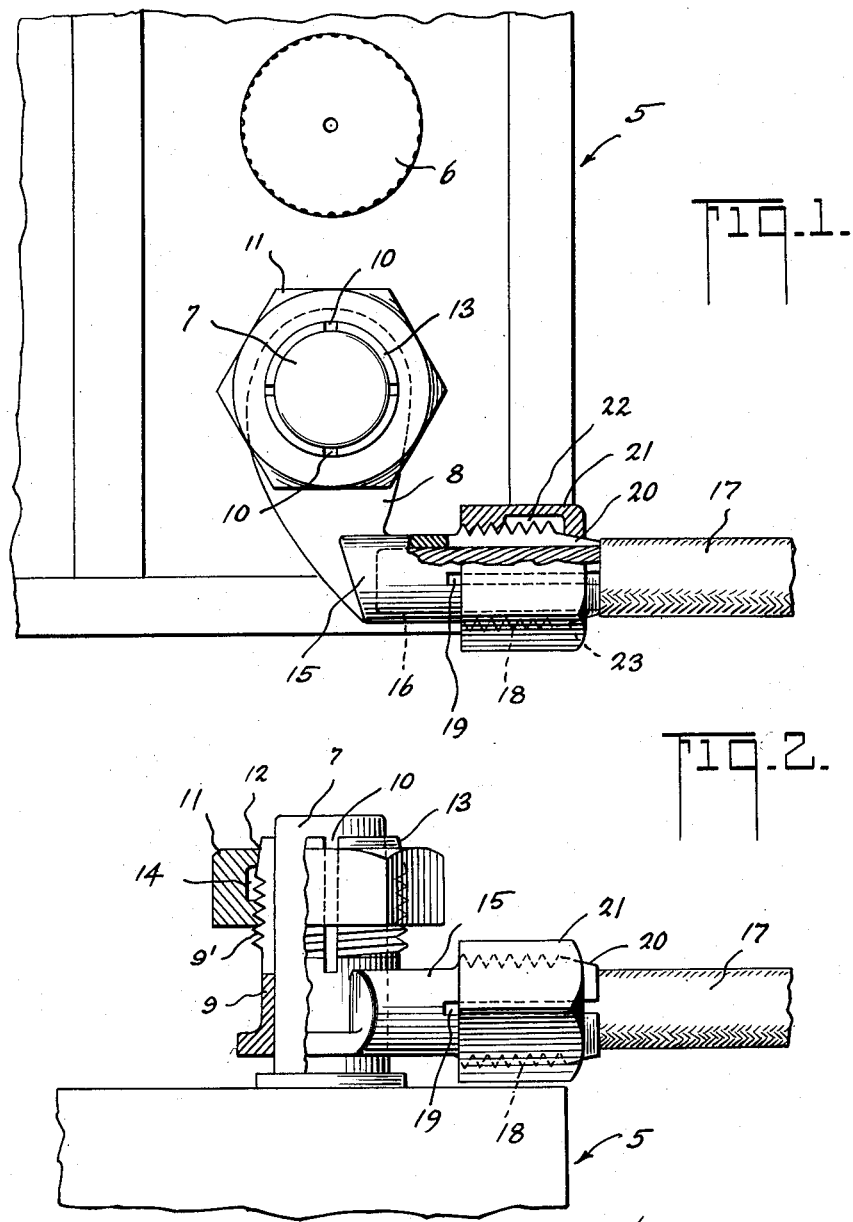
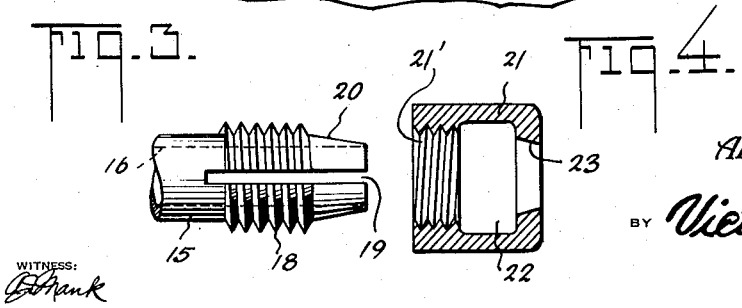
ARTHUR H. MORRIS
INVENTOR Patented Mar. 1, 1932

1,847,972

UNITED STATES PATENT OFFICE

ARTHUR H. MORRIS, OF WEST PATERSON, NEW JERSEY

BATTERY CONNECTER

Application filed July 17, 1930. Serial No. 468,657.

This invention relates to improvements in connecters for storage batteries and has for one of its objects to improve and simplify the construction and utility of devices of this character.

Another object of the invention is to provide an improved storage battery connecter which may be quickly secured to or released from the battery post without danger of injury to the other parts of the battery.

A still further object is to provide a battery connecter which will combine a simple method of quickly securing the cable to same and insuring a firm contact without the use of solder.

Other objects and advantages of the invention will be hereinafter specifically pointed out, or will become apparent, as the specification proceeds.

With the above indicated objects in view, the invention resides in certain novel constructions and combinations and arrangement of parts, clearly described in the following specification and fully illustrated in the accompanying drawings, which latter shows embodiments of the invention as at present preferred.

In the drawings:

Fig. 1 is a partial plan view of the top of a storage battery box, showing one of the improved battery connecters, and showing a top elevation, partially in section, of the means of connecting the cable to the connecter.

Fig. 2 is a side elevation of the embodiment, partially in section, and showing certain details of construction in broken lines.

Fig. 3 is a side elevation of the portion of the embodiment which receives the end of the cable.

Fig. 4 is a sectional view of the locking nut which secures the cable to the connecter.

Similar reference characters refer to similar parts throughout said drawings.

Referring now more particularly to said drawings, the figure 5 indicates a portion of the top of a standard storage battery, having a cap 6 for closing the water opening therein and a battery post 7 which is secured to the battery.

The improved battery connecter includes a terminal structure 8, constructed of aluminum, brass, or other suitable metal and is provided with a vertical socket or collar 9, integral therewith and adapted to engage the post 7. The upper portion of the socket is provided with a number of vertical slots 10 and the external portion of said socket is provided with threads 9' when these slots are converged a firm contact between the socket and said post is secured and this is brought about by means of a novel locking nut 11, the lower internal portion of which is provided with threads 11' which engage the external threads 9' on the socket portion 9.

The upper portion 12 of said nut is internally tapered, as shown in Fig. 2, this tapered portion having a lesser diameter than the diameter of the threaded portion and the upper part of said tapered portion having a smaller diameter than the lower portion thereof. When the nut is screwed onto the socket this tapered collar portion engages the upper portion 13 of the socket, said portion 13 also being tapered. It will thus be seen that as the nut is screwed downward the tapered collar portion presses against the upper portion of the socket and causes the sides thereof to firmly engage the post 7, thereby ensuring a firm contact. An internal cavity portion 14 between the collar portion and the threaded portion is provided in order to allow the nut to be readily screwed onto the socket.

The embodiment also includes a lug portion 15, integral with said terminal structure, said lug portion having a central aperture 16, as indicated by the broken lines in Fig. 3, to receive the end of the cable 17. The lug is provided with external threads 18 and a number of longitudinal slots or openings 19 and a tapered end portion 20. A locking nut 21 is constructed similar to the locking nut 11, this locking nut 21 being provided with internal threads 21', a cavity portion 22 and an internally tapered head portion 23. This nut is inserted over the cable 17 before the latter is placed in the aperture in the lug portion. The nut is then screwed onto the lug 15, the tapered portion 23 of the nut engaging the tapered end portion 20 of the lug, thereby causing the lug to converge and securely grip the wire. When desired, the wire may be quickly released by unscrewing the nut.

The hereinbefore described construction admits of considerable modification without departing from the invention; therefore, it is the wish not to be limited to the precise arrangements shown and described, which are as aforesaid, by way of illustration merely. In other words, the scope of protection contemplated is to be taken solely from the appended claims, interpreted as broadly as is consistent with the prior art.

What is claimed is:

1. In a storage battery connecter the combination of a metal terminal structure provided with a socket portion to engage the post of a storage battery and a lug portion, integral therewith, to receive the end of a cable, said socket portion and said lug portion being externally screw-threaded and having tapered ends and having a plurality of longitudinal splits therein thereby providing arcuate portions, a locking nut adapted to be screwed on said socket portion and said lug portion, said lock nut having a lower threaded portion, an intermediate cavity portion having a larger diameter than said threaded portion, and a tapered upper portion having a lesser diameter than said threaded portion, said tapered upper portion being adapted to engage the tapered ends of said socket portion and said lug portion, when said nut is screwed onto the latter, causing said arcuate portion in said socket and lug portions to converge, thereby gripping said battery post and said cable.

2. A storage battery connecter including a metal terminal structure having a body portion, a socket portion to engage the post of a storage battery and a lug portion to receive the end of a cable, both of said latter portions being integral with said body portion, said socket portion and said lug portion being externally threaded and having a plurality of longitudinal splits therein and having tapered end portions, lock nuts adapted to be screwed on said socket portion and said lug portion, said lock nuts having a lower threaded portion, an intermediate cavity portion having a larger diameter than said threaded portion, and a tapered upper portion having a lesser diameter than said threaded portion, said tapered upper portion being adapted to engage the tapered end portions of said socket portion and said lug portion, when said nuts are screwed thereon, causing the split parts of said socket and lug portions respectively to converge, thereby gripping respectively said battery post and said cable.

In testimony whereof I hereby affix my signature.

ARTHUR H. MORRIS.